(12) United States Patent
Nishiji

(10) Patent No.: US 8,057,352 B2
(45) Date of Patent: Nov. 15, 2011

(54) GEAR AND DIFFERENTIAL APPARATUS PROVIDED THEREWITH FOR VEHICLE

(75) Inventor: Makoto Nishiji, Woluwe-Saint-Lambert (BE)

(73) Assignee: JTEKT Corporation, Osaka-shi (JP)

( * ) Notice: Subject to any disclaimer, the term of this patent is extended or adjusted under 35 U.S.C. 154(b) by 388 days.

(21) Appl. No.: 12/370,924

(22) Filed: Feb. 13, 2009

(65) Prior Publication Data

US 2009/0215576 A1  Aug. 27, 2009

(30) Foreign Application Priority Data

Feb. 25, 2008 (JP) ................. 2008-043019

(51) Int. Cl.
*F16H 57/08* (2006.01)
*F16H 1/32* (2006.01)
*F16H 1/20* (2006.01)
*F16H 1/12* (2006.01)
*F16H 1/18* (2006.01)

(52) U.S. Cl. ....... 475/344; 475/180; 74/421 R; 74/424.5

(58) Field of Classification Search ................. 74/421 R, 74/424.5, 425, 457, 458, 468; 475/180, 248, 475/252, 333, 344
See application file for complete search history.

(56) References Cited

U.S. PATENT DOCUMENTS

| 4,546,834 A * | 10/1985 | Menzel .................... 173/146 |
| 5,295,922 A | 3/1994 | Amborn et al. |
| 5,518,464 A | 5/1996 | Teraoka |
| 5,727,430 A * | 3/1998 | Valente .................... 74/650 |
| 5,785,624 A | 7/1998 | Mayr |
| 5,951,430 A | 9/1999 | Kobayashi |
| 6,263,571 B1 * | 7/2001 | Dooner et al. ............. 29/893.35 |
| 6,360,625 B1 * | 3/2002 | Miyazaki et al. ............... 74/348 |
| 6,449,846 B2 * | 9/2002 | Dooner et al. ............. 29/893.35 |
| 6,708,578 B2 * | 3/2004 | Burgman et al. ........... 74/421 R |
| 6,802,229 B1 * | 10/2004 | Lambert ........................ 74/348 |
| 7,097,585 B2 * | 8/2006 | Nishiji ......................... 475/248 |
| 7,273,433 B1 * | 9/2007 | Troester ........................ 475/17 |
| 7,436,090 B1 * | 10/2008 | Brady et al. .................... 310/20 |
| 2009/0062058 A1 * | 3/2009 | Kimes et al. .................. 475/344 |

FOREIGN PATENT DOCUMENTS

DE  811650  8/1951

OTHER PUBLICATIONS

European Search Report dated Aug. 4, 2011 issued for European Application No. 09153214.3, filed Feb. 2, 2009.

* cited by examiner

*Primary Examiner* — David D Le
*Assistant Examiner* — Michael Gonzalez
(74) *Attorney, Agent, or Firm* — Oblon, Spivak, McClelland, Maier & Neustadt, L.L.P.

(57) ABSTRACT

A differential apparatus for a vehicle comprises a pair of output gears 3, 4, first and second pinion gear 5, 6 intermeshing with the output pinion gears, and a differential case 2 accommodating the output gears and pinion gears. The second pinion gear 6 has large and small gear portions 6A, 6B whose pitch diameters are different and whose which tooth numbers is same respectively, and a tooth crest 60 and a tooth recess 61 formed to be shared by the large and the small gear portions 6A, 6B continuously from the large gear portion 6B to the small gear portion 6A.

10 Claims, 6 Drawing Sheets

GEAR AND DIFFERENTIAL APPARATUS PROVIDED THEREWITH FOR VEHICLE

INCORPORATION BY REFERENCE

The present application claims priority under 35 U.S.C. §119 to Japanese Patent Application No. 2008-043019, filed on Feb. 25, 2008. The contents of the application are incorporated herein by reference in their entirety.

BACKGROUND OF THE INVENTION

1. Field of the Invention

The present invention relates to a gear and a differential apparatus provided therewith for a vehicle, and more particularly relates to the gear having two gear portions and the differential apparatus for a vehicle disposed between a right and a left tire wheels or between front tire wheels and rear tire wheels.

2. Description of the Related Art

A differential apparatus for a vehicle is disclosed in Japanese Tokkaihei No. 8-247253, especially in FIG. 2 which disclosing a plurality of pinion gears and side gears, whose axes are parallel to each other.

This conventional differential apparatus for a vehicle as prior art mainly consists of a differential case rotated by receiving torque from an engine, a pair of side gears, each disposed on a rotational axis O of the differential case, a first pinion gear intermeshing with one of the pair of the side gears and a second pinion gear intermeshing with the first pinion gear and the other of the pair of the side gears respectively. The second pinion gear includes two gear portions.

The differential case has a pair of tire shaft inserting in which two tire shafts are respectively inserted. A gear accommodating space in the differential case accommodates the pair of side gears, the first pinion gear and the second pinion gear.

The pair of side gears accommodated in the gear accommodating space are positioned on the rotational axis of the differential case. One of the pair of side gears has a smaller pitch diameter than the other side gear. The tire shafts are respectively connected by spline fitting to an inner surface of the pair of side gears.

The first pinion gear is positioned at a periphery of the one side gear having the smaller pitch diameter.

The second side gear is a step gear having a step or neck portion between two gear portions. One gear portion having the smaller pitch diameter is disposed to engage with the first pinion gear and with the one of the pair of side gears, and the other gear portion having the larger pitch diameter is disposed to engage with the other side gear of the pair of side gears.

When torque from the engine of the vehicle is input to the differential case, the rotational torque is transmitted to the first pinion gear and the second pinion gear. Because the pair of side gears are engaged with the tire shafts, torque from the engine is distributed according to a driving state of the vehicle, to be transmitted to the right and left tire shafts through the differential case, the first pinion gear, the second pinion gear and the pair of side gears.

In this case, when the first pinion gear and the second pinion gear tend to rotate around their own axes upon a differential between the side gears, this causes sliding of the first and second pinion gears on inner surfaces defining the gear accommodating space of the differential case, thereby generating frictional resistance between the first/second gears and the inner surfaces to restrict the differential rotation of the pair of side gears.

Also, although there is no explicit disclosure in this document, it is obvious for an ordinary skilled person in this technology that where each of the gears is constructed as a helical gear and a thrust force is generated at an intermeshing portion upon a transmission of torque from the first pinion gear and the second pinion gear to the pair of side gears, the pair of side gears are moved along their axis by the thrust force. Then, the pair of side gears are pressed to each other or to the inner opening peripheral edges of the tire shaft inserting holes so that rotational frictional resistance is generated between the pair of side gears.

However, because there is a step portion, the mechanical strength of the second pinion gear against torsion torque generated at the step portion is weak. Therefore, in order to maintain strength of the second pinion gear against torsion torque, the diameter of the second pinion gear, or the set number of pinion gears, is made larger. As a result, the apparatus becomes large when the diameter of the gear is large or the total cost of the apparatus becomes high when the set number is large.

Also, where the conventional differential apparatus is disposed between the right tire shaft and the left tire shaft, a strictly identical differential rotational ratio or differential restricting performance between the pair of side gears connecting right and left tire shafts is required, as compared to that between the front and rear tire shafts. However, it is difficult to achieve the exact same differential rotational ratio or differential restricting performance, whereby there can occur different torque transmitting performances for the right and left tire shafts during straight driving or an unbalanced differential rotational ratio or differential restricting performance during right or left turning.

SUMMARY OF THE INVENTION

In view of the previously mentioned circumstances, it is an object of the present invention to provide a gear obtaining a sufficient mechanical strength against torsion torque and to provide a light and inexpensive differential apparatus for a vehicle.

It is second object of the present invention to provide a differential apparatus for a vehicle which is able to provide a balanced differential speed ratio and torque distributing performance, not only between the front and rear tire shafts but also between the right and left tire shafts.

In order to achieve the above and other objects, one feature of the present invention provides a gear comprising large and small gear portions, each of which has a different pitch diameter and each of whose teeth number is identical, and a tooth crest and a tooth recess shared by the large and the small gear portions continuously from the large gear portion to the small gear portion. Thereby, since there is no step or neck portion between two gear portions of the second pinion gear, the gear according to the present invention can obtain sufficient mechanical strength against torsion torque.

A second feature of the present invention provides a differential apparatus for a vehicle including a pair of output gears, a first pinion gear intermeshing with one of the output pinion gears, with a gear axis parallel to the first pinion gear, a second pinion gear intermeshing with both of the other output pinion gears and the first pinion gear, with gear axes parallel to the second pinion gear respectively, and a differential case accommodating the pair of output gears, the first pinion gear and the second pinion gear. The second pinion gear has large and small gear portions, each of whose pitch diameters is different respectively and each of whose teeth number is the same respectively, and a tooth crest and a tooth recess shared by the large and the small gear portions continuously from the large gear portion to the small gear portion. Thereby, the differential apparatus according to the present invention can reduce the diameter of the second pinion and the set number of the pinion gear, so that the apparatus can be light and inexpensive.

A third feature of the present invention provides a differential apparatus for a vehicle according to the second feature, further including a gear supporting portion positioned between the small gear portion and the one of the output gears and having an inner surface fit to a tooth edge surface of the small gear portion of the second pinion gear. Thereby, a moment from the small gear portion of the second pinion gear toward the rotational axis O of the differential case is supported by the gear supporting portion to prevent an inclined movement of the second pinion gear and maintain optimum intermeshing of the gears.

A fourth feature of the present invention provides a differential apparatus for a vehicle in which the second pinion gear is disposed at a position to generate a moment from the intermeshing point with the first pinion gear directed to the rotational axis of the differential case in the coast mode. Thereby, it is possible to generate a large moment in the coast mode and to restrict the generation of the moment in the driving mode.

A fifth feature of the present invention provides a differential apparatus for a vehicle wherein the intermeshing tooth lengths at the driving side are different from the intermeshing tooth lengths at the coast side. Thereby, the second pinion gear can receive a load more widely in the driving than in the coast side.

A sixth feature of the present invention provides a differential apparatus for a vehicle wherein one of the output gears has a wider tooth width intermeshing with the first pinion gear than a tooth width of the other of the side gears intermeshing with the second pinion gear. Thereby, the side gear can intermesh with the first pinion gear over a wide range along its axial direction so that the first pinion gear can be stably intermeshed with the side gear and the second pinion gear, thereby achieving enough mechanical strength.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Whole Construction of the Differential Apparatus for the Vehicle

Figure 1:
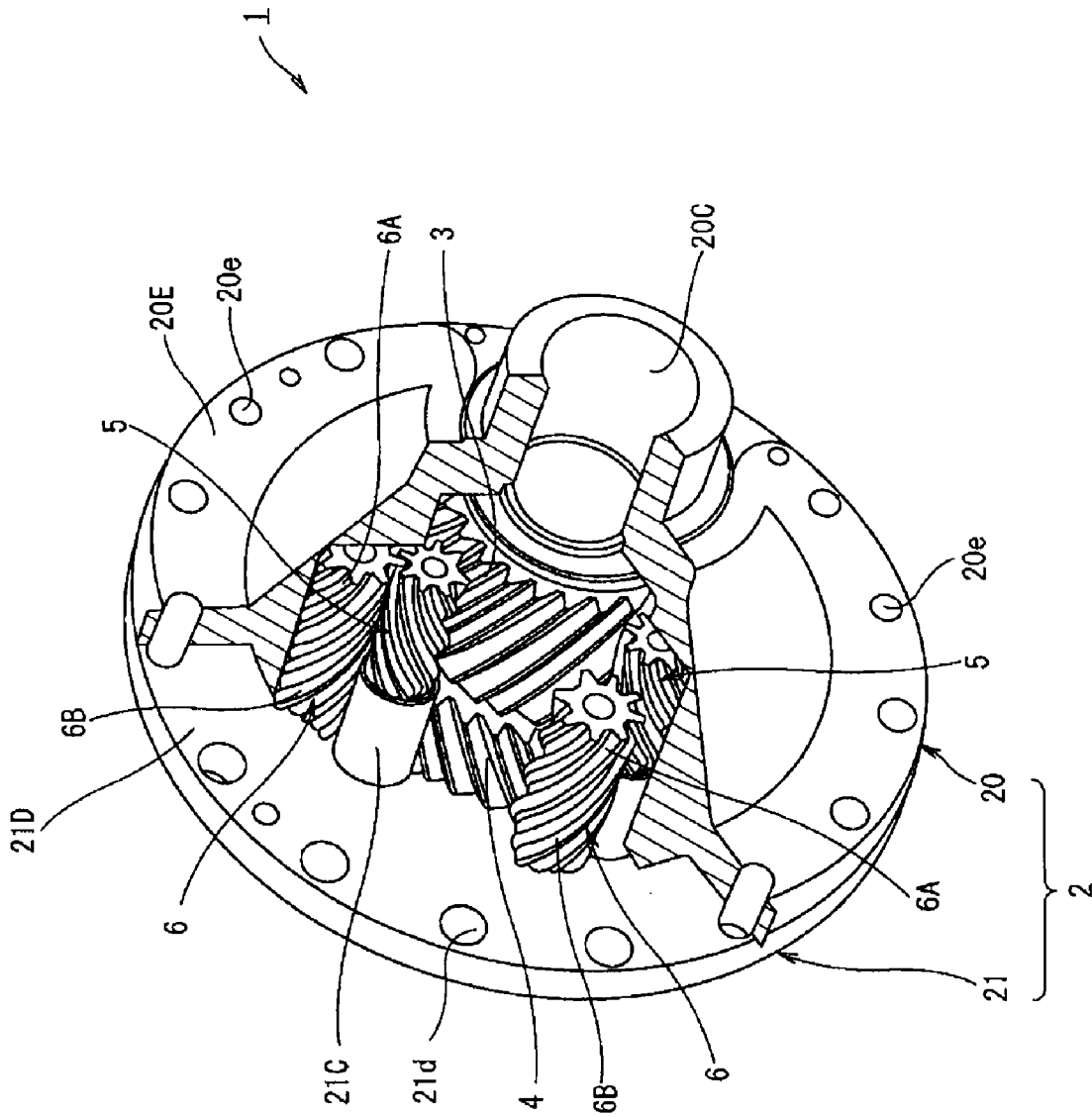
FIG. 1 is an oblique perspective and partially cross sectional drawing explaining a gear and a differential apparatus therewith for a vehicle according to one embodiment of the present invention.
Figure 2:
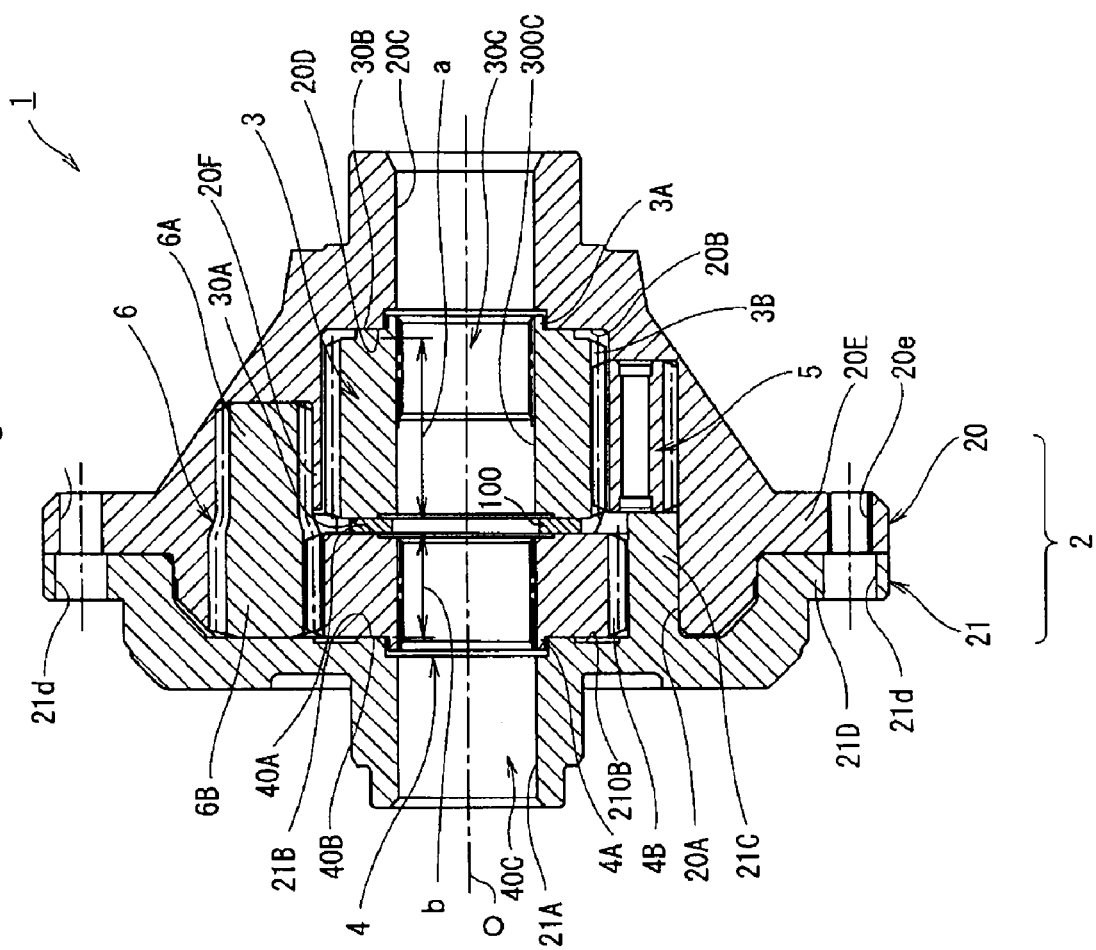
FIG. 2 is an cross sectional diagram explaining the gear and the differential apparatus for the vehicle according to the one embodiment of the present invention.

In FIG. 1 and FIG. 2, a numeral 1 shows the differential apparatus for the vehicle according to one embodiment of the present invention. The differential apparatus 1 mainly consists of a differential case 2, a pair of side gears 3, 4, a first pinion gear 5 and a second pinion gear 6. The differential case 2 is rotated by receiving torque from an engine. The pair of side gears 3, 4 are respectively positioned on a rotational axis O of the differential case 2 as an output gear. The first pinion gear 5 intermeshes or engages in mesh with the side gear 3 of the pair of side gears 3, 4 and the second pinion gear 6 intermeshes with both of the first pinion gear 5 and the side gear 4, respectively.

[Construction of the Differential Case 2]

As shown in FIGS. 1 and 2, the differential case 2 has a first case element 20 and a second case element 21 and is constructed as a hollow cylindrical body rotated around the rotational axis O as a whole. The first case element 20 includes a parts inserting opening 20A opening to one direction along the rotational axis O and the second case element 21 covers the parts inserting opening 20A of the first case element 20.

The first case element 20 is provided with a gear accommodating space 20B communicating with the parts inserting opening 20A and accommodating therein the side gears 3, 4, the first pinion gear 5 and the second pinion gear 6, as shown in FIG. 2.

The first case element 20 is also provided with a tire shaft inserting hole 20C communicating with the gear accommodating space 20B and opening to an outside of the differential case 2 along the rotational axis O. The tire shaft inserting hole 20C includes a stepped penetrating hole having an approximately constant inner diameter and being inserted by an unillustrated right tire shaft. On an inner peripheral opening edge of the tire shaft inserting hole 20C is provided a supporting portion 20D supporting slidably a back surface portion of the right side gear 4.

On an end portion of the first case element 20 at a side of the parts inserting opening is provided an annular flange 20E projecting from an outer peripheral surface of the differential case 2 for assembling a ring gear and the case elements 20, 21. On the flange 20E are a plurality of penetrating holes 20e formed at predetermined distances from each other along a circumferential direction.

Figure 3:
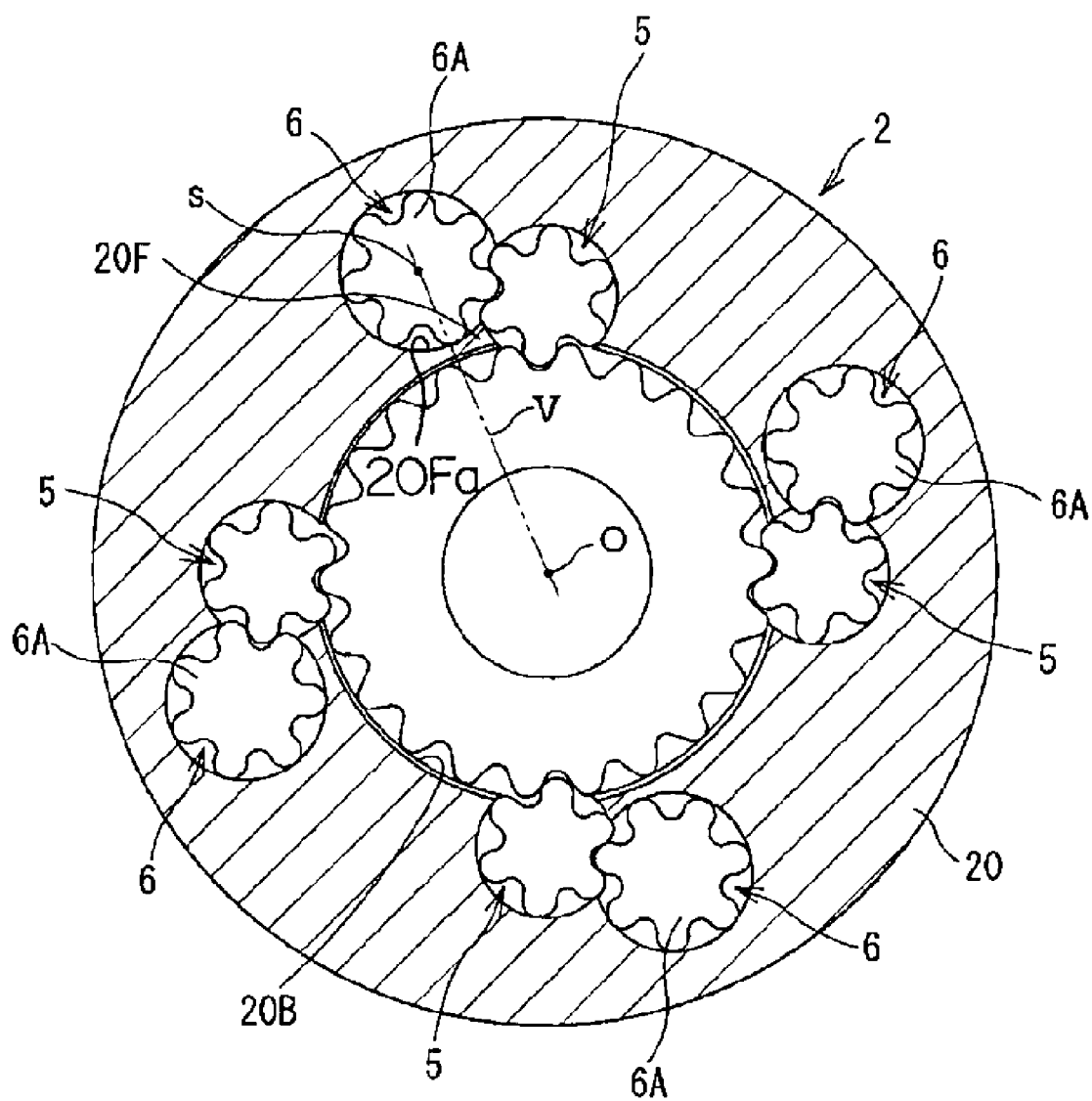
FIG. 3 is a cross sectional drawing explaining a gear supporting portion of the gear and the differential apparatus for the vehicle according to the one embodiment of the present invention.

On an inner portion of the first case element 20 is provided a gear supporting portion 20F, as a whole, positioned between the side gear 3 and a small gear portion 6A of the second pinion gear 6 and projected from an inner opening peripheral edge of the shaft inserting hole 20C in a direction of the second case element 21. The small gear portion 6A of the second pinion gear 6 has a smaller pitch diameter than a large gear portion 6B described in detail later. The gear supporting portion 20F formed as a bow in cross section, as shown in FIG. 3, is positioned to cross a virtual line V linked an axis "s" of the small gear portion 6A of the second pinion gear 6 and the rotational axis O of the differential case 2. An inner surface 20Fa of the gear supporting portion 20F is a curvature surface fit to a tooth edge surface of the small gear portion 6A of the second pinion gear 6. Thereby, the inner surface of the gear supporting portion 20F can support a moment force generated by an intermeshing of the small gear portion 6A of the second pinion gear 6 with the first pinion gear 5. The moment force tends to be directed to the rotational axis O of the differential case 2. As a result, this prevents the inclined movement of the second pinion gear 6, to maintain an optimal intermeshing of gears.

On the other hand, in the second case element 21 is provided a tire shaft inserting hole 21A communicating with the gear accommodating space 20B and opening to out of the differential case 2 along the rotational axis O, as shown in FIG. 2. The tire shaft inserting hole 21A has a substantially constant inner diameter and is a stepped penetrating hole inserted by an unillustrated left tire shaft. In an inner opening peripheral edge of the tire shaft inserting hole 21A is provided a left side gear supporting portion 21B supporting a back surface of the side gear 4.

In the second case element 21 also is provided a convex portion 21C projecting from the inner opening peripheral edge of the tire shaft inserting hole 21A and supporting one side of edge surfaces of the first pinion gear 5.

On an opening edge of the second case element 21 at a side of first case element 20 is provided a flange 21D projecting from a peripheral surface of the differential case 2 for assembling the ring gear and the case elements 20, 21. On the flange 21D are a plurality of penetrating holes 21d formed at predetermined distances from each other along a circumferential direction.

[Construction of the Side Gear 3]

The side gear 3 is an annular helical gear, as shown in FIG. 1, having a boss portion 3A and a gear portion 3B, whose diameters are different from each other as shown in FIG. 2. The helical gear of the side gear 3 has a larger outer diameter than each of outer diameters of the first pinion gear 5 and the second pinion gear 6. The side gear 3 is supported slidably by supporting portion 20D for the right side, in a state that the boss portion 3A is inserted into the tire shaft inserting hole 20C and accommodated rotatably in the gear accommodating space 20B of the first case element 20 within the differential case 2. The side gear 3 intermeshes with the first pinion gear 5 in alignment of an axis Of the side gear 3 with the rotational axis O.

The side gear 3 has a wider tooth width "a" engaging in mesh with the first pinion gear 5 than a tooth width "b" of the side gear 4 engaging in mesh with the large gear portion 6B of the second pinion gear 6. The large gear portion 6B of the second pinion gear 6 has a larger pitch diameter than that of a small gear portion 6A. Thereby, the side gear 3 can intermesh with the first pinion gear 5 over a wide range along its axial direction so that the first pinion gear 5 engages with two different gears: the side gear 3 and the second pinion gear 6, and stable intermeshing with both gears 3, 6 can be achieved with enough mechanical strength. An inner portion of the side gear 3 intermeshes in spline fitting with the unillustrated right tire shaft inserted into the tire shaft inserting hole 20C.

[Construction of the Side Gear 4]

The side gear 4 is an annular helical gear, as shown in FIG. 1, having a boss portion 4A and a gear portion 4B as shown in FIG. 2. The helical gear of the side gear 4 has a larger outer diameter than each of outer diameters of the first pinion gear 5 and the second pinion gear 6. The side gear 4 is supported slidably by supporting portion 21B for the left side of the gear in a state that the boss portion 4A is inserted into the tire shaft inserting hole 21A and accommodated rotatably in the gear accommodating space 20B of the first case element 20 within the differential case 2. The side gear 3 intermeshes with the large gear portion 6B of the gear portion 6A, 6B of the second pinion gear 6 in alignment of an axis Of the side gear 4 with the rotational axis O.

The side gear 4 has a larger pitch diameter than that of the side gear 3 and the number of teeth of the side gear 4 is the same as that of the side gear 3. An inner portion of the side gear 4 intermeshes in spline fitting with the unillustrated left tire shaft inserted into the tire shaft inserting hole 21A.

The side gear 3 and the side gear 4 respectively have side end surfaces 30A, 40A facing each other through a washer 100 and a frictional sliding diameter or area and a friction coefficient of the side gear 3 against the washer 100 are equal respectively to those of the side gear 4 against the washer 100. The side gear 3 and the side gear 4 respectively have other side end surfaces 30B, 40B, each of which has the same frictional sliding diameter or area and the same friction coefficient as each other, due to the annular recess portion 210B being provided on the supporting portion 21B for the left side gear, as shown in FIG. 2.

The side gear 3 has an undercut portion 300C at a part of an inner hole 30C so that a spline engaging length of the side gear 3 with the right tire shaft is almost the same as a spline engaging length of the side gear 4 with the left tire shaft.

[Construction of the First Pinion Gear 5]

The first pinion gear 5 is a helical gear, as shown in FIG. 1, accommodated rotatably in the gear accommodating space 20B of the first case element 20 within the differential case 2 as shown in FIG. 2. The first pinion gear 5 intermeshes with both side gear 3 and small gear portion 6A of the second pinion gear 6 in a state that a gear shaft of the first pinion gear 5 is parallel to each of those of side gear 3 and the second pinion gear 6.

[Construction of the Second Pinion Gear 6]

The second pinion gear 6 is a helical gear, as shown in FIG. 1, having the small and large gear portions 6A, 6B as shown in FIG. 2. The small gear portion 6A has a pitch diameter d1 and a helix angle $\beta 1$ and the large gear portion 6B has a pitch diameter d2 and a helix angle $\beta 2$, each of which pitch diameters d1, d2 is different each other in d1<d2 and each of which helix angles $\beta 1$, $\beta 2$ is different each other in $\beta 1 < \beta 2$. The number of teeth of the small gear portion 6A is the same as the number of teeth of the large gear portion 6B, and the gear portions 6A, 6B share a tooth crest 60 and a tooth recess 61 formed continuously from the small gear portion 6A to the large gear portion 6B, as shown in FIG. 5B. Therefore, the second pinion gear 6 as a whole does not have any step or neck portion between two gear portions 6A, 6B, as the conventional apparatus does, so that the second pinion gear 6 according to the present invention has enough stiffness against torsion torque. The second pinion gear 6 intermeshes with each of the first pinion gear 5 and the side gear 4 and is rotatably accommodated in the gear accommodating space 20B of the first case element 20 within the differential case 2.

The engaging reaction force of the small gear portion 6A with the first pinion gear 5 is changeable sequentially by torque transmitted to the right tire wheel through the side gear 3. Also, engaging reaction force of the large gear portion 6B with the side gear 4 is changeable sequentially by torque transmitted to the left tire wheel. Therefore, there is a need to substantially counteract the axial components of forces generated on the small gear portion 6A and the large gear portion 6B in a state of identical torque at the right and left tire wheels, in order to minimize the difference between the right and left torque distribution in straight driving (non-differential) or in turning (differential).

Where the tangent component, that is a circumferential component, of force generated at the small gear portion 6A is Ft1 and the tangent component of force generated at the large gear portion 6B is Ft2 in the state of the same torque at right and left tire wheels, the equation "Ft2=Ft1*(d1/d2)" is established. In this equation where the pitch diameter d1 is smaller than the pitch diameter d2 as d1<d2, the equation follows as Ft2>Ft1.

Where the axial or thrust component of force generated at the small gear portion 6A is Fx1 and the axial component of force generated at the large gear portion 6B is Fx2, the equations "Fx1=Ft1*tan β1" and "Fx2=Ft2*tan β2" are established.

Conditions to balance and counteract all axial components of force generated at each of gears are represented as the equation "Ft1*tan β1=Ft2*tan β2=Ft1*(d1/d2)*tan β2".

Therefore, the equation is solved as "β2=tan$^{-1}$((d2/d1)*tan β1)" so that it should be set that the "β2" is larger corresponding to the equation than "β1" at the condition of d1<d2.

The pitch diameter d2 of the large gear portion 6B is larger than the pitch diameter d1 of the small gear portion 6A. In this embodiment of the present invention, the pitch diameter d2 of the large gear portion 6B is 10% more than the pitch diameter d1 of the small gear portion 6A.

The helix angle β1 of the small gear portion 6A is smaller than the helix angle β2 of the large gear portion 6B. In this embodiment of the present invention, the helix angle β1 of the small gear portion 6A is 30 degrees and the helix angle β2 of the large gear portion 6B is about 32.4 degrees.

Thereby, where same rotational torque acts on each of the gear portions 6A, 6B as a reaction force, each of axial components of force generated at each of the gear portions 6A, 6B counteract each other so that there is no difference in the torque transmitting performances of the right and left tire wheels, or any speed imbalance of the tire wheels or torque distributing performance when the vehicle is turning.

Besides, if each of the helix angles of gear portions 6A, 6B is set to be the same, as in the conventional differential apparatus, after a driving force is transmitted from the differential case 2 to the first pinion gear 5 and the second pinion gear 6 during straight driving (non-differential) and even torque of right and left wheels, the axial component of force generated at the second pinion gear 6 by intermeshing of the large gear portion 6B with the side gear 4 is smaller than the axial component of force generated at the second pinion gear 6 by intermeshing of the small gear portion 6A with the first pinion gear 5. The last axial component of force is thrust force generated in an opposite direction to thrust force generated at the second pinion gear 6 by intermeshing of the large gear portion 6B with the side gear 4. As a result, in the conventional apparatus, the thrust force generated at the side gear 3 is larger than the thrust force generated at the side gear 4 even though each of right and left wheel torques is the same as each other, so that the torque transmitting performance is unbalanced between the right and left wheels at non-differential or differential states. However, according to the present invention, the helix angles of the gear portions 6A, 6B are not the same as each other, that is to say, the helix angle of the small gear portion 6A is smaller than the helix angle of the large gear portion 6B.

The gear portions 6A, 6B of the second pinion gear 6 have respective taper portions at their opposite ends in order to prevent outer peripheral portions of the opposite ends from contacting directly with inner surfaces of the first case element 20 and the second case element 21 of the differential case 2. By adjusting taper amounts of the gear portions 6A, 6B, a diameter "g" of a circular flat area 6Bb of the edge of the large gear portion 6B contacting with the inner surface of the second case element 21 of the differential case 2 equals to a diameter "h" of a circular flat area 6Aa of the edge of the small gear portion 6A contacting with the inner surface of the first case element 20 of the differential case 2, as shown in FIG. 5B. A distance from a center of the circular contacting area of the edge of the large gear portion 6B to the rotational axis O is equal to a distance from a center of the circular contacting area of the edge of the small gear portion 6A to the rotational axis O. Because of this construction, when the second pinion gear 6 is pressed to the differential case 2 in either direction by the same force, it is possible to achieve the same differential restriction force.

Figure 4A:
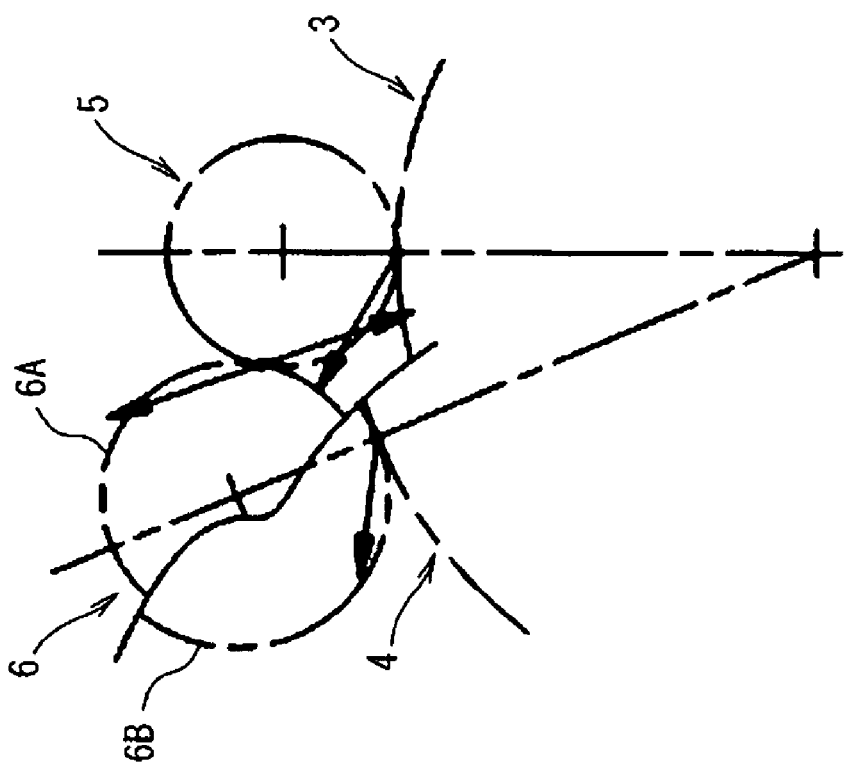
FIGS. 4A, 4B are a side view explaining a moment generated at an intermeshing point of a first pinion gear and a second pinion gear of the gear and the differential apparatus for the vehicle according to the one embodiment of the present invention.
Figure 4B:
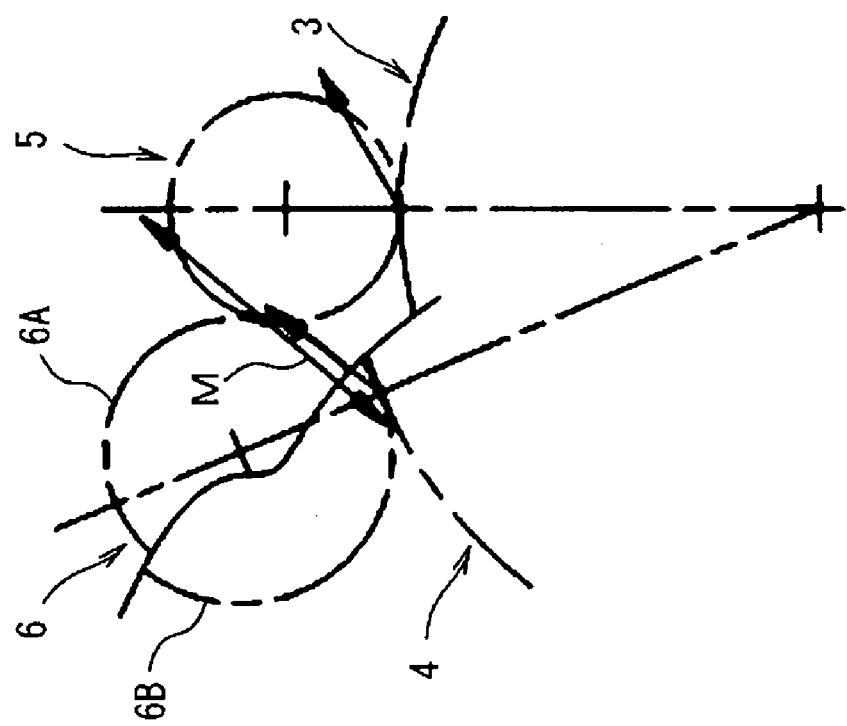

The second pinion gear 6 is disposed at a position to generate a moment M from an engaging point with the first pinion gear 5 directed to the rotational axis O of the differential case 2 in a coast mode. Thereby, as shown in FIG. 4A, in coast mode it is possible to generate a large moment M, and it is possible to restrict the generation of the moment M in a driving mode as shown in FIG. 4B.

Figure 5A:
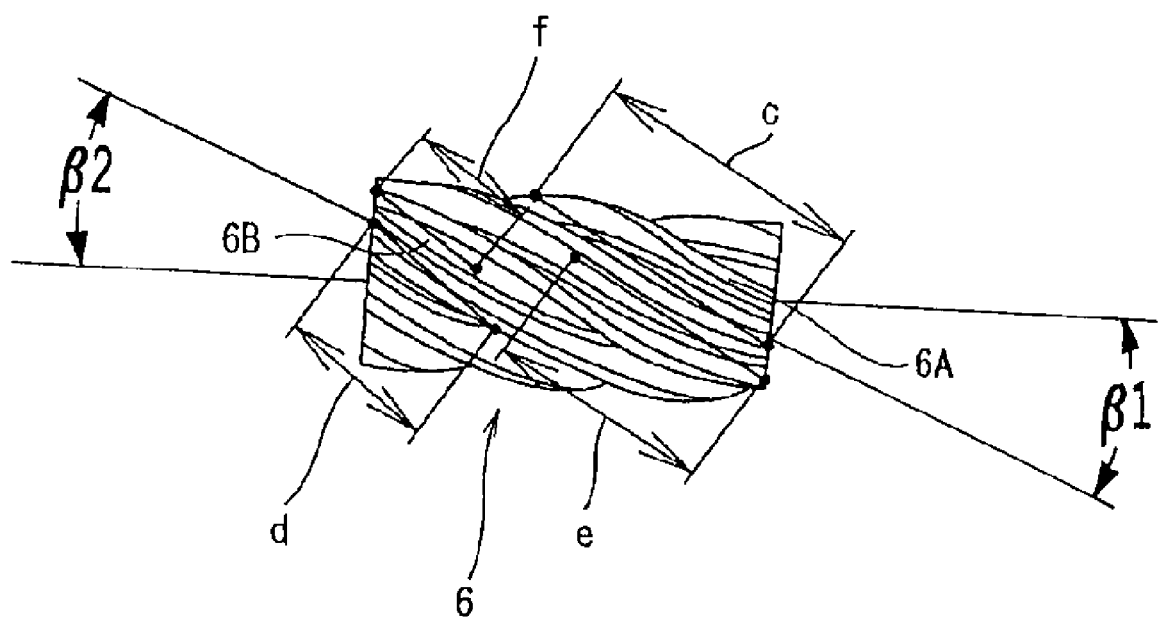
FIGS. 5A, 5B are a front view and a sectional view explaining a second gear used for the gear and the differential apparatus for the vehicle according to the one embodiment of the present invention.
Figure 5B:
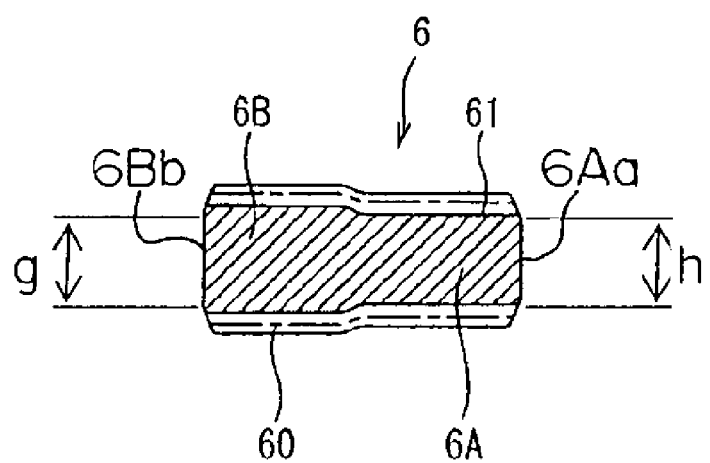

As shown in FIG. 5A, in the gear portions 6A, 6B, each of intermeshing tooth lengths c, d at a driving side is different from corresponding intermeshing tooth lengths e, f at a coast side, that is to say c>e and d>f. Thereby, the second pinion gear 6 can receive a load more widely in driving than in coasting.

As explained above, the gear portions 6A, 6B are set to have the same tooth number as each other and to share the tooth crest 60 and the tooth recess 61 formed continuously from the small gear portion 6A to the large gear portion 6B, as shown in FIG. 5B. The small gear portion 6A intermeshes with the side gear 5 and the large gear portion 6B intermeshes with the side gear 4 in a way that each gear axis is parallel to each other. All gears used in this embodiment of the present invention are standard gears, the small gear portion 6A has smaller module of specifications than that of the large gear portions 6B. A pitch diameter ratio of the gear portions 6A, 6B is set to be equal to a pitch diameter ratio of the side gears 3, 4. Thereby, a differential speed ratio of the side gears 3, 4 is equal, that is to say 1 to 1 (1:1).

[Operation of the Differential Apparatus 1 for the Vehicle]

First of all, when torque from the engine of the vehicle is input to the differential case 2 through the drive pinion and the ring gear, the differential case 2 is rotated around the rotational axis O. Upon the rotation of the differential case 2, rotational force is transmitted to the first pinion gear 5 and the second pinion gear 6, then to the side gears 3, 4 through the first pinion gear 5 and the second pinion gear 6. Because the right and left side gears 3, 4 are intermeshed with the unillustrated tire shafts in spline fitting, torque from the engine is transmitted to the right and left tire shafts through the drive pinion, the ring gear, the differential case 2, the first pinion gear 5, the second pinion gear 6 and the side gears 3, 4.

Where the vehicle is driven in straight line and there is no slip between the road and each tire wheel on the right and left tire shafts, the first pinion gear 5 and the second pinion gear 6 are revolved, without self-rotation, around the center axis Of the side gears 3, 4 upon the transmission of the torque from the engine to the housing. The first pinion gear 5, the second pinion gear 6 and the side gears 3, 4 are rotated as a body with the differential case 2 so that torque from the engine is transmitted equally to right and left tire shafts on a basis of equality basically, but adjusting instantly to any unbalance in road reactions within the differential restricting torque distribution, thereby to rotate each tire wheel at the same rotational speed.

Where the right tire drops into muddy ground to cause a slip, the first pinion gear 5 and the second pinion gear 6 are rotated around their own axes in self-rotation with intermeshing with the side gears 3, 4 so that torque from the engine is distributed differently to the right and left tires. In practice, the left tire wheel is rotated at lower speed than the speed of the differential case 2 and the right tire wheel is rotated at higher speed than the speed of the differential case 2. The torque from the engine is distributed with more torque to the left tire wheel receiving the larger road reaction as a predetermined uneven distribution ratio between the right and left tire shafts or tire wheels, so that any driving force loss is reduced. And also, slippage of the right tire wheel due to reduced transmission of torque to the right tire wheel is reduced.

Where the first pinion gear 5 and the second pinion gear 6 are rotated around their own axes, because each of tooth edge faces of the first pinion gear 5 and the second pinion gear 6 slides on the inner surface defining the gear accommodating space 20B, there occurs frictional resistance between them so that differential restricting torque is generated at the side gears 3, 4 by these frictional forces.

By the rotation of the first pinion gear 5 and the second pinion gear 6 around each of their axes, thrust force is generated on each of the engagement surfaces with the side gears 3, 4 in the rotational axis direction of the first pinion gear 5, the second pinion gear 6 and the side gears 3, 4. In the driving mode to drive the right and left tire wheels by the engine in twisted directions of each gear shown in FIG. 1, each of the side gears 3, 4 is moved to be separated from each other by the thrust force generated at the side gears 3, 4 pushed to the supporting portions 20D, 21B so that frictional resistance arises between the side gear 3 and the supporting portion 20D and between the side gear 4 and the supporting portion 21B. Therefore, the differential restricting torque is generated at the side gears 3, 4 by this second frictional resistance.

Also, where the side gears 3, 4 have different transmitting torque, it tends to generate thrust force toward either of the first pinion gear 5 or the second pinion gear 6 which has a smaller torque. In this case, the end surfaces of these pinion gears 5, 6 are pushed in contact with the corresponding inner surfaces of the first case element 20 and the second case element 21 so that frictional resistance arises against the self-rotation of the first pinion gear 5 and the second pinion gear 6 around its own axis. Therefore, the differential restricting torque is generated at the side gears 3, 4 by this third frictional resistance.

All Effects of the Embodiment

The gear and the differential apparatus provided therewith for the vehicle according to the present invention achieve the following effects.
1. Since there is no step or neck portion between two gear portions 6A, 6B of the second pinion gear 6, the second pinion gear 6 has enough stiffness against torsion torque. Therefore, there is no need to increase the diameter of the second pinion and the set number of the pinion gears, as in the conventional apparatus, so that the apparatus can be light and inexpensive.
2. The moment of the small gear portion 6A of the second pinion gear 6 toward the rotational axis O of the differential case 2 is supported by the gear supporting portion 20F so that inclined movement of the second pinion gear 6 is prevented, to maintain optimum intermeshing of the gears.
3. The second pinion gear 6 is disposed at a position to generate a moment M from the intermeshing point with the first pinion gear 5 to the rotational axis O of the differential case 2 in the coast mode, so that it is possible to generate the moment M largely in the coast mode and to restrict the generation of the moment M in the driving mode.
4. The intermeshing tooth lengths c, d in the driving side are different from the intermeshing tooth lengths e, f in the coast side, that is to say c>c and d>f, so that the second pinion gear 6 can receive load more widely in driving than in coasting.
5. The side gear 3 can intermesh with the first pinion gear 5 over a wide range along its axial direction so that the first pinion gear 5 can be stably intermeshed with the side gear 3 and the second pinion gear 6, thereby achieving enough mechanical strength.
6. As a consequence, the gear and the differential apparatus provided therewith for the vehicle according to the present invention achieves a balanced differential speed ratio to the right/left tire wheels and a good distribution performance of the restricted differential torque.

Figure 6:
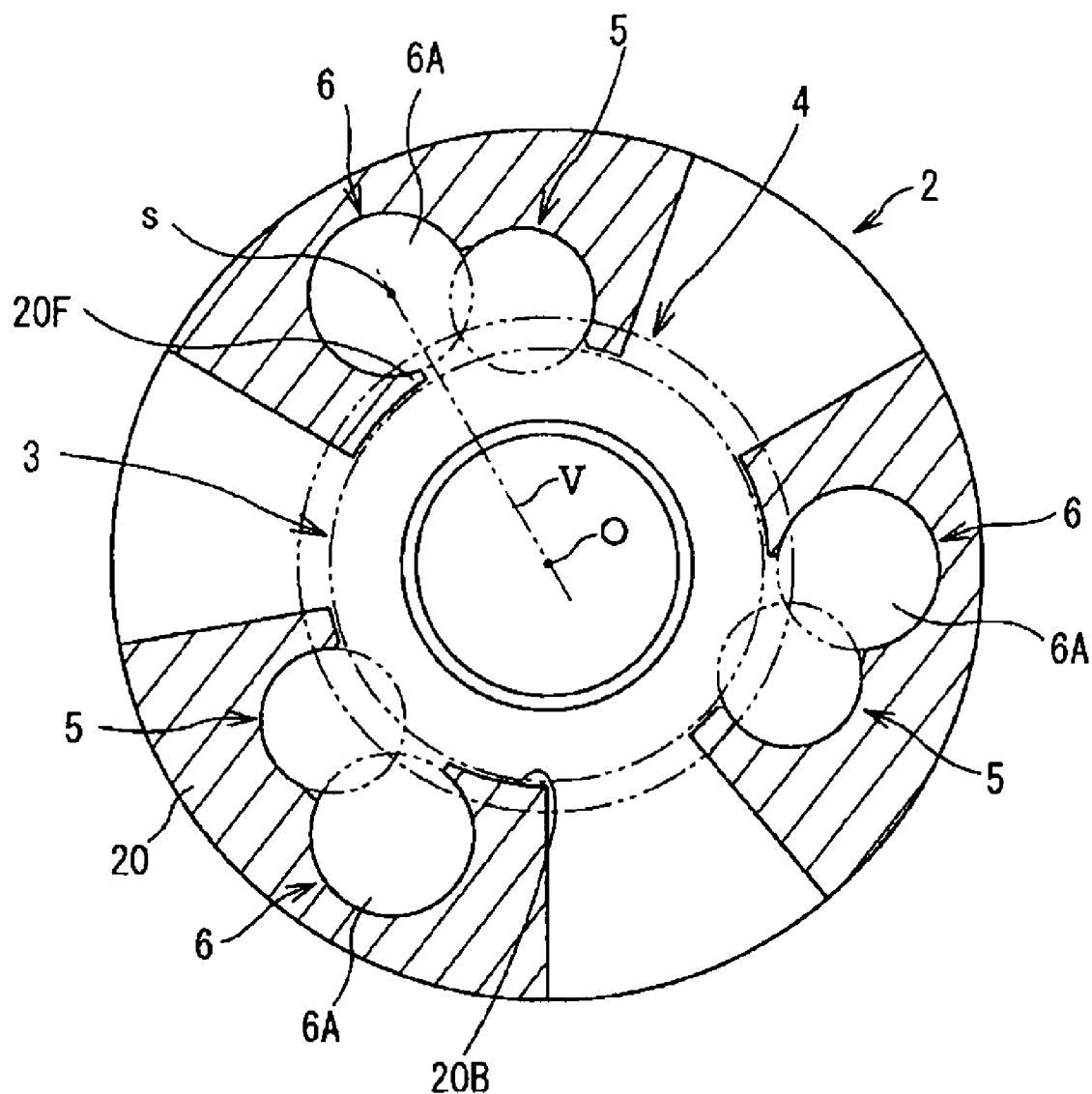
FIG. 6 is another embodiment of the gear supporting portion of the gear and the differential apparatus for the vehicle according to the one embodiment of the present invention.

While the invention has been described in detail with reference to the preferred embodiment, it will be apparent to those skilled in the art that the invention is not limited to the present embodiments, and that the invention may be realized in various other embodiments within the scope of the claims. For example, the next items are possible for other embodiments.
1. While it is described that the first pinion gear 5 and the second pinion gear 6 intermeshing with the side gears 3, 4 are accommodated in the differential case 2, the invention may be constructed by more than three pinion gears in the differential case 2.
2. While it is described that the pitch diameter ratio of the gear portions 6A, 6B is equal to the pitch diameter ratio of the side gears 3, 4, another ratio may be used for the front and rear tire wheels.
3. While it is described that the tooth numbers of the gear portions 6A, 6B are the same as each other and the pitch diameter ratio is different, the invention may be manufactured for these gear portions by a tool of the same module or a different module, or it may be the standard gear or a profile shifted gear.
4. While it is described that the gear supporting portion 20F is positioned to cross the virtual line V linked the axis "s" of the small gear portion 6A and the rotational axis O of the differential case 2, the gear supporting portion 20F need not cross the virtual line V linked the axis "s" of the small gear portion 6A and the rotational axis O of the differential case 2 as shown in FIG. 6.

What is claimed is:
1. A gear comprising:
a large and a small gear portions each of whose pitch diameter is different respectively;
a number of teeth of each of said gear portions is the same as each other; and
a tooth crest and a tooth recess are shared by said large and said small gear portions continuously from said large gear portion to said small gear portion,
wherein each of said large and said small gear portions has a circular flat area at each edge of said large and said small gear portions, and
a diameter of said circular flat area of said edge of said large gear portion is the same as a diameter of said circular flat area of said edge of said small gear portion.
2. A gear according to claim 1, wherein:
each of said large and said small gear portions is a helical gear formed in the same twisted direction;

a helix angle of said small gear portion having a small pitch diameter is smaller than a helix angle of said large gear portion having a large pitch diameter.

3. A differential apparatus for a vehicle with a gear comprising:

a pair of output gears, each having a gear axis;

a first pinion gear intermeshing with one of said pair of output gears, said first pinion gear has a gear axis parallel to said gear axis of said one of the output gears;

a second pinion gear intermeshing with the other of said pair of output gears and with said first pinion gear, said second pinion gear has a gear axis parallel to said gear axes of said other of the output gears and said first pinion gear;

a differential case having an accommodating space accommodating said pair of output gears, said first pinion gear and said second pinion gear, said gear axis of each of said output gears is positioned on a rotational axis of said differential case; and said second pinion gear has large and small gear portions, each of whose pitch diameter is different respectively, a number of teeth of each of said gear portions is the same as each other, and each of said large and said small gear portions has a tooth crest and a tooth recess shared by said large and said small gear portions continuously from said large gear portion to said small gear portion.

4. A differential apparatus for a vehicle with a gear according to claim 3, wherein:

said differential case includes a gear supporting portion positioned between said small gear portion having a smaller pitch diameter and said one of output gears and accommodated in said gear accommodating space to be extended from said differential case toward said other of output gears; and said gear supporting portion has an inner surface fit to a tooth edge surface of said small gear portion of said second pinion gear.

5. A differential apparatus for a vehicle with a gear according to claim 3, wherein:

said second pinion gear is located at a position generating a moment from an intermeshing point with said first pinion gear directed to said rotational axis of said differential case in a coast mode.

6. A differential apparatus for a vehicle with a gear according to claim 3, wherein:

an intermeshing tooth length at a driving side of the second pinion gear is different from an intermeshing tooth length at a coast side of the second pinion gear.

7. A differential apparatus for a vehicle with a gear according to claim 3, wherein:

one of said output gears has a wider tooth width intermeshing with said first pinion gear than a tooth width of the other of said side gears intermeshing with said second pinion gear.

8. A differential apparatus for a vehicle with a gear according to claim 3, wherein:

each of said pair of output gears, said first pinion gear and said second pinion gear is a helical gear.

9. A differential apparatus for a vehicle with a gear according to claim 3, wherein:

the number of teeth of said pair of output gears is set to be the same as each other.

10. A differential apparatus for a vehicle with a gear comprising:

a pair of output gears, each having a gear axis;

a first pinion gear intermeshing with one of said pair of output gears, said first pinion gear has a gear axis parallel to said gear axis of said one of the output gears;

a second pinion gear intermeshing with the other of said pair of output gears and with said first pinion gear, said second pinion gear has a gear axis parallel to said gear axes of said other of the output gears and said first pinion gear;

a differential case having an accommodating space accommodating said pair of output gears, said first pinion gear and said second pinion gear, said gear axis of each of said output gears is positioned on an rotational axis of said differential case;

said second pinion gear has large and small gear portions, each of whose pitch diameter is different respectively, a number of teeth of each of said gear portions is the same as each other, and each of said large and small gear portions has a tooth crest and a tooth recess shared by said large and said small gear portions continuously from said large gear portion to said small gear portion; and said differential case includes a gear supporting portion positioned between said small gear portion of said second pinion gear and said one of the output gears and accommodated in said gear accommodating space, and extended from said differential case toward said other of output gears, said gear supporting portion has an inner surface fit to a tooth edge surface of said small gear portion of said second pinion gear.

* * * * *